United States Patent
Singh et al.

(10) Patent No.: US 10,691,739 B2
(45) Date of Patent: Jun. 23, 2020

(54) MULTI-LABEL CONTENT RECATEGORIZATION

(71) Applicant: McAfee, LLC, Plano, TX (US)

(72) Inventors: Nidhi Singh, Tuebingen (DE); Craig Philip Olinsky, Paderborn (DE); Thamizhannal Paramasivam, Tiruvannamalai (IN)

(73) Assignee: McAfee, LLC, Santa Clara, CA (US)

( * ) Notice: Subject to any disclaimer, the term of this patent is extended or adjusted under 35 U.S.C. 154(b) by 474 days.

(21) Appl. No.: 14/977,875

(22) Filed: Dec. 22, 2015

(65) Prior Publication Data

US 2017/0177627 A1    Jun. 22, 2017

(51) Int. Cl.
  *G06F 16/35*  (2019.01)
(52) U.S. Cl.
  CPC .................. *G06F 16/353* (2019.01)
(58) Field of Classification Search
  CPC ......... G06F 17/30598; G06F 17/30303; G06F 16/353
  USPC .......................................................... 707/769
  See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 8,572,072 B1* | 10/2013 | Roumeliotis | G06F 17/30707 705/14.4 |
| 8,954,437 B2* | 2/2015 | Chitiveli | G06F 17/30707 707/737 |
| 9,002,848 B1 | 4/2015 | Peng et al. | |
| 2003/0130993 A1 | 7/2003 | Mendelevitch et al. | |
| 2009/0281970 A1* | 11/2009 | Mika | G06F 17/241 706/12 |
| 2010/0005241 A1* | 1/2010 | Kim | G06F 12/0897 711/122 |
| 2010/0185577 A1* | 7/2010 | Tsaparas | G06N 99/005 706/52 |

(Continued)

FOREIGN PATENT DOCUMENTS

| | | |
|---|---|---|
| WO | 2015092962 A1 | 6/2015 |
| WO | 2017112168 A1 | 6/2017 |

OTHER PUBLICATIONS

Cesa-Bianchi et al., "Prediction, Learning, and Games", Cambridge University Press; 2006.

(Continued)

*Primary Examiner* — Jay A Morrison
*Assistant Examiner* — Ken Hoang
(74) *Attorney, Agent, or Firm* — Patent Capital Group

(57) ABSTRACT

In an example, there is disclosed a computing apparatus, including one or more logic elements, including at least one hardware logic element, comprising a classification engine to: receive a clean multi-labeled dataset comprising a plurality of document each assigned to one or more of a plurality of categories; receive an unclean multi-labeled dataset; and produce a recategorized and cleansed dataset from the unclean multi-labeled dataset, comprising predicting a number of labels Î for a document j, and comparing Î to an existing number of labels l. There is also disclosed a method of providing a classification engine.

25 Claims, 8 Drawing Sheets

(56) References Cited

U.S. PATENT DOCUMENTS

2011/0052063 A1* 3/2011 McAuley .............. G06K 9/527
                                                    382/180
2011/0289434 A1   11/2011 Kieft
2014/0379619 A1* 12/2014 Permeh ............... G06N 99/005
                                                    706/12
2015/0058378 A1   2/2015 Jones et al.

OTHER PUBLICATIONS

International Search Report and Written Opinion issued in PCT Application No. PCT/US2016/062630 dated Feb. 27, 2017; 8 pages.
Kolter et al., "Dynamic Weighted Majority: An Ensemble Method for Drifting Concepts", Journal of Machine Learning Research vol. 8; Dec. 2007; pp. 2755-2790.
Opitz et al., "Popular Ensemble Methods: An Empirical Study"; Journal of Artificial Intelligence Research 11; Published Aug. 1999; pp. 169-198.

* cited by examiner

MULTI-LABEL CONTENT RECATEGORIZATION

FIELD OF THE SPECIFICATION

This disclosure relates in general to the field of machine learning, and more particularly, though not exclusively to, a system and method for multi-label content recategorization.

BACKGROUND

Machine-driven classification of static objects, such as web pages, text documents, or multimedia content, is useful in contexts such as security and productivity.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
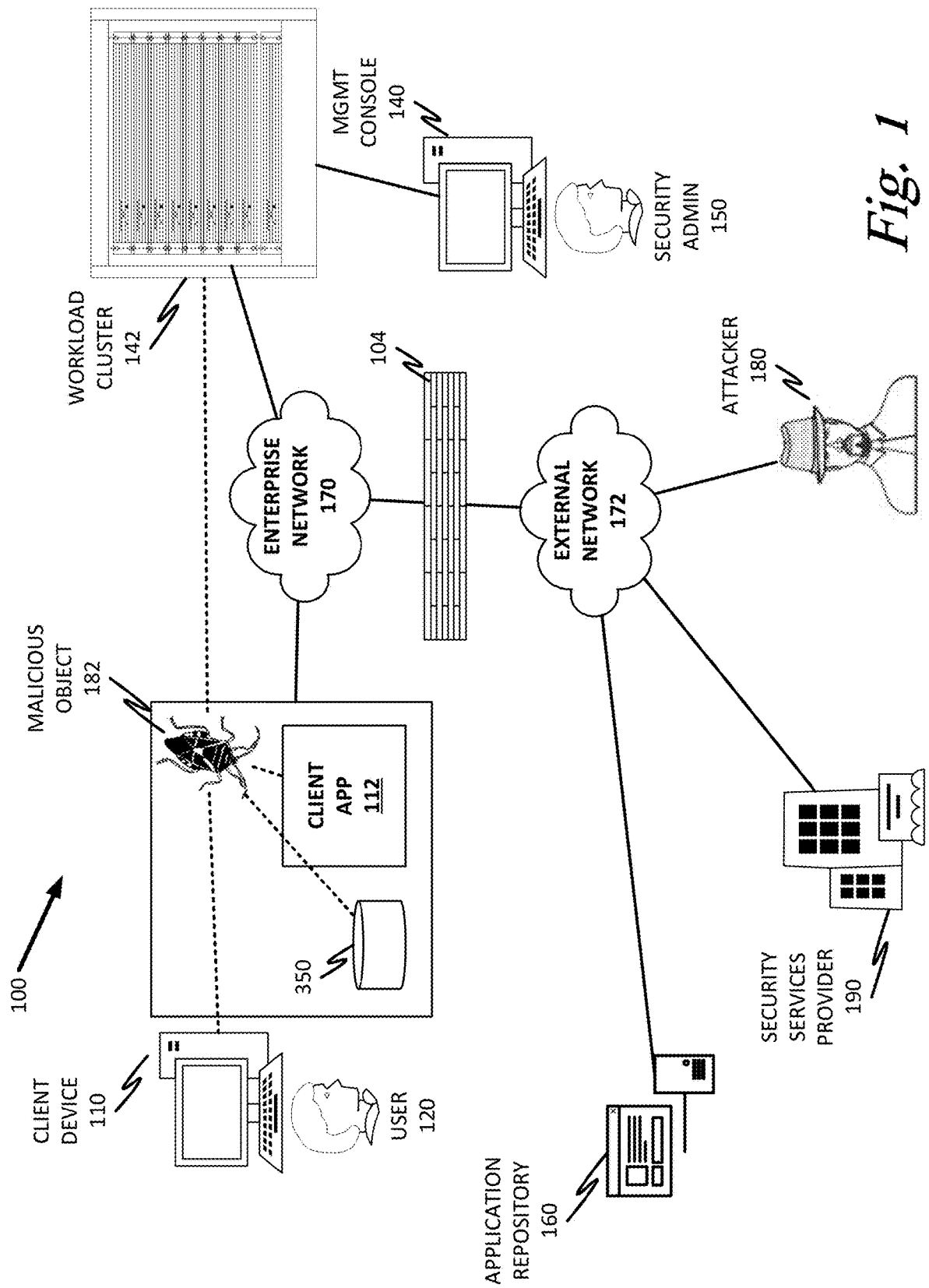
FIG. 1 is a block diagram of a security-enabled network according to one or more examples of the present specification.

In an example, there is disclosed a computing apparatus, including one or more logic elements, including at least one hardware logic element, comprising a classification engine to: receive a clean multi-labeled dataset comprising a plurality of document each assigned to one or more of a plurality of categories; receive an unclean multi-labeled dataset; and produce a recategorized and cleansed dataset from the unclean multi-labeled dataset, comprising predicting a number of labels $\hat{l}$ for a document j, and comparing $\hat{l}$ to an existing number of labels l. There is also disclosed a method of providing a classification engine.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments many have different advantages, and no particular advantage is necessarily required of any embodiment.

In one nonlimiting example, an enterprise may have firewall rules configured to treat certain classes of websites differently. Business-essential websites (such as corporate websites, business information, partner sites, and similar) may be always allowed. Non-essential but harmless websites (such as news, general information, and e-commerce) may be allowed but logged. Time-wasting websites (such as sports, games, fashion, or other non-business-related subject matters) may be allowed only with explicit user input. Malicious websites (such as malware, or websites with illegal or unethical content) may be blocked and permissible only with special administrative dispensation.

Because there are many millions of websites, it may be impractical to have a human user manually classify each website. Rather, a machine classifier may be employed to classify each website, and then permissions may be applied en grosse to each class. Thus, machine learning can be used to help deploy and enforce enterprise security and other policies.

Similarly, a machine classifier may be used to assign ownership or other attributes to business documents. For example, an enterprise may deploy a database file system, in which files must be assigned attributes, such as which group owns each document, which client or job number a document belongs to, or similar attributes. The classifier may use existing metadata fields, file locations, and content to assign these attributes (each constituting a "class") to each document.

In some cases, classification is mutually exclusive. For example, when assigning ownership to a document, enterprise constraints may dictate that only one group can own the document. Thus, the classes are mutually exclusive (e.g., the owner can be either "Business" or "Marketing," but not both). In other cases, classes may be more analogous to "tags," and thus may be non-exclusive. For example, a popular sports website that also frequently features scantily-clad women and swimsuits, may be tagged as both "sports" and "soft pornography." In the latter case, the site may inherit the permission set of its most-restricted tag.

In practical application, a machine classifier may also be constrained by non-technical considerations. For example, a system designer may be able to design an optimum taxonomy for classifying static objects, but may instead be restricted to an existing taxonomy that is non-optimal, but carries the weight of enterprise momentum. In that case, the classifier itself may need to be intelligent enough to make up for deficiencies in the non-optimal taxonomy.

In some cases, very large-scale classification may present particular challenges. For example, "web-scale" text classification deals with classifying millions of text documents (e.g., web pages) into one or more classes, from a previously known finite set of classes.

In this specification, "multi-label" classification is provided by way of example. Where a static object needs to be classified into exactly one class, "single label" classification is used. When a static object is to be classified into more than one class, "multi-label" classification is used.

By way of example, this specification presents an embodiment of web-scale, multi-labeled text classification in the presence of large "overlapping" classes. Overlapping classes imply ambiguous regions in the data where the probability for two or more classes (i.e., the "overlapping classes") is approximately equal. In that case, it may be very difficult to distinguish between those classes, at least as they pertain to a particular set of static objects. As noted above, it may be impractical to reorder the taxonomy because of non-technical requirements. Thus, it is advantageous to have a classifier capable of performing large-scale, multi-labeled text classification in the presence of classes that have significant overlaps.

An example machine classifier according to one or more examples of the present specification provides a "three-tier" classification framework, capable of (1) performing multi-labeled text classification; (2) in the presence of large overlapping classes; and (3) for web-scale or other large-scale datasets. Experimental evaluation of the machine classifier described herein, performed on real datasets including approximately 1.2 million web pages, outperformed other select machine learning algorithms in both precision and recall.

In an example multi-labeled classification task, the objective is to learn a predictor that associates an instance x to a subset of classes (or labels) $S \in Y$, from a previously known set of classes Y. A multi-labeled dataset D may be represented as $(x_1,S_1), \ldots, (x_{|D|},S_{|D|})$.

Given this form of dataset, this specification illustrates classifying millions of text documents when many large classes in Y have significant overlap.

A class overlap may arise from an ambiguity in the data space, such that in certain regions, the prior probability for two or more classes is almost equal. As a result, it may be difficult for the machine classifier to learn a predictor to form an appropriate decision boundary for the overlapping classes. From a machine learning perspective, this problem is further compounded by the presence of multiple labels for each instance. As described above, in some practical applications, it is infeasible to make any changes in the structure or definition of classes. Furthermore, a deployed machine classifier of the present specification may, as a normal operating condition, receive hundreds of thousands of instances per month of overlapping classes.

In an example of the present specification, pairs of equally large overlapping classes may compound the difficulty of the classification problem.

In certain embodiments, it is also possible for an initial multi-label assignment to be non-optimal. Thus, this specification also describes a method of "cleansing" multi-labeled content. It should be noted that the initial assignments may have been made using the "three-tiered" categorization scheme described above, or any other suitable categorization scheme.

In the present context, multi-label indicates that a document or object can be assigned to multiple categories or labels, and cleansing refers to validating and correcting the categories assigned to a document.

Given a large corpus of documents, in which each document had been initially assigned more than one category, such as by a three-tiered method as described above, by any other software or automated method, or by a human user, the methods disclosed in this specification may be used to verify that each of the assigned categories of a document is correct. If the assigned categories are incorrect, the method may also determine a more correct set of categories and replace the old, incorrect categories with the new, more correct categories. It should be noted that in this example, the categories are fixed. In other words, the example method disclosed in FIG. 7 does not include operations for altering the categories themselves.

In the disclosed method, a classification engine may use ensemble learning-based method to recategorize multi-labeled documents in a large-scale corpus. Ensemble learning may be understood to be a specialized branch of machine learning. Ensemble learning may include multiple algorithms, the outputs of which are compounded together in a well-defined way to produce the final ensemble prediction. Each algorithm comprising the ensemble may be referred to individually as an "expert." Each expert may be assigned a weight in accordance with its effectiveness (e.g., its accuracy), and the weights may be iteratively updated according to a pre-defined criteria.

In an example, the classification engine divides a multi-labeled dataset into training, validation and test sets. Using the training set, the classification engine creates (1) a Support Vector Regression (SVR) model capable of predicting the number of labels (i.e., categories) that can be associated with each object; and (2) a multinomial classifier (i.e., first expert in the ensemble) capable of predicting the labels that can be associated with each instance. Thereafter, the classification engine uses a validation set to tune the parameters of both models. Using the test set, the classification engine computes the precision of the expert, which may be used as "reference point" in later stages of the algorithm.

Next, the classification engine iterates over the target "unclean" dataset (i.e., in need of recategorization), and predicts the number of labels for each instance i, along with the corresponding probability.

Depending on whether the predicted number of labels is equal to, greater than, or less than the existing number of labels for instance i, and on whether the predicted set of labels (hereafter Ŝ) is equal to, is contained within, or is partially/totally disjoint with the existing set of labels (hereafter S). For example, for instance i, the classification engine selects the final labels from S and Ŝ, and replaces the existing labels with the newly selected labels for instance i.

In each iteration, a number of instances are cleansed or recategorized in this way. The classification engine then creates an expert using these cleansed instances after every iteration. The experts are compounded in the ensemble using, for example, "Dynamic Weighted Majority," and the updated ensemble prediction is used in the next iterations for predicting the set of labels for remaining instances in the target, unclean dataset.

FIG. 1 is a network-level diagram of an enterprise 100 receiving classification services according to one or more examples of the present specification. In the example of FIG. 1, one or more users 120 operate one or more client devices 110. Each device may include an appropriate operating system, such as Microsoft Windows, Linux, Android, Mac OSX, Apple iOS, Unix, or similar. Some of the foregoing may be more often used on one type of device than another. For example, desktop computers or engineering workstation may be more likely to use one of Microsoft Windows, Linux, Unix, or Mac OSX. Laptop computers, which are usually a portable off-the-shelf device with fewer customization options, may be more likely to run Microsoft Windows or Mac OSX. Mobile devices may be more likely to run Android or iOS. However, these examples are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices, which in an example may be virtualized within workload cluster 142. In this illustration, enterprise network 170 is shown as a single network for simplicity, but in some embodiments, enterprise network 170 may include a large number of networks, such as one or more enterprise intranets connected to the internet. Enterprise network 170 may also provide access to an external network, such as the Internet, via external network 172. External network 172 may similarly be any suitable type of network.

A workload cluster 142 may be provided, for example as a virtual cluster running in a hypervisor on a plurality of rack-mounted blade servers, or as a cluster of physical servers. Workload cluster 142 may provide one or more server functions, or one or more "microclouds" in one or more hypervisors. For example, a virtualization environment such as vCenter may provide the ability to define a plurality of "tenants," with each tenant being functionally separate from each other tenant, and each tenant operating as a single-purpose microcloud. Each microcloud may serve a distinctive function, and may include a plurality of virtual machines (VMs) of many different flavors, including agentful and agentless VMs.

It should also be noted that some functionality of endpoint devices 110 may also be provided via workload cluster 142. For example, one microcloud may provide a remote desktop hypervisor such as a Citrix workspace, which allows users 120 operating endpoints 110 to remotely login to a remote enterprise desktop and access enterprise applications, workspaces, and data. In that case, endpoint 120 could be a "thin client" such as a Google Chromebook, running only a stripped-down operating system, and still provide user 120 useful access to enterprise resources.

In an example, one or more virtual machines are provisioned within workload cluster 142 to act as a machine classifier. The machine classifier may be tasked with classification of network objects, including static and/or dynamic objects, for any suitable purpose. For example, classification may be provided for enforcement of enterprise security and network usage policies, such as by classifying websites into various categories, each with different security settings or permissions. Similarly, the machine classifier may classify text documents for storage in a database file system. In another nonlimiting example, the machine classifier may be tasked with indexing content to ease searching and compilation. In yet another example, network objects are classified for security purposes, and assigned to a classification such as "white" (permitted), "gray" (unknown), or "black" (barred) as part of an antivirus or antimalware scheme. In the latter case, the objects may be any network object as described herein, including static objects, active objects, and network-attached devices. These embodiments are provided as nonlimiting examples only, and should be understood to be non-exclusive. Many other uses for object classification are possible, and are within the intended scope of this specification.

One or more computing devices configured as a management console 140 may also operate on enterprise network 170. Management console 140 may provide a user interface for a security administrator 150 to define enterprise security policies, which management console 140 may enforce on enterprise network 170 and across client devices 110 and workload cluster 142. In an example, management console 140 may run a server-class operating system, such as Linux, Unix, or Windows Server. In another case, management console 140 may be provided as a web interface, on a desktop-class machine, or via a VM provisioned within workload cluster 142.

Secured enterprise 100 may encounter a variety of "security objects" on the network. A security object may be any object that operates on or interacts with enterprise network 170 and that has actual or potential security implications. In one example, security objects may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, such as for example a word processing document with built-in macros or an animation with inline code. For security purposes, these may be considered as a separate class of software object, or may simply be treated as executable objects.

Secured enterprise 100 may communicate across enterprise boundary 104 with external network 172. Enterprise boundary 104 may represent a physical, logical, or other boundary. External network 172 may include, for example, websites, servers, network protocols, and other network-based services. In one example, an application repository 160 is available via external network 172, and an attacker 180 (or other similar malicious or negligent actor) also connects to external network 172. A security services provider 190 may provide services to secured enterprise 100.

It may be a goal of users 120 and secure enterprise 100 to successfully operate client devices 110 and workload cluster 142 without interference from attacker 180 or from unwanted security objects. In one example, attacker 180 is a malware author whose goal or purpose is to cause malicious harm or mischief, for example by injecting malicious object 182 into client device 110. Once malicious object 182 gains access to client device 110, it may try to perform work such as social engineering of user 120, a hardware-based attack on client device 110, modifying storage 350 (FIG. 3), modifying client application 112 (which may be running in memory), or gaining access to enterprise servers 142.

The malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110. As used throughout this specification, malicious software ("malware") includes any security object configured to provide unwanted results or do unwanted work. In many cases, malware objects will be executable objects, including by way of non-limiting examples, viruses, trojans, zombies, rootkits, backdoors, worms, spyware, adware, ransomware, dialers, payloads, malicious browser helper objects, tracking cookies, loggers, or similar objects designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation.

Attacker 180 may also want to commit industrial or other espionage against secured enterprise 100, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious himself, a developer contributing software to application repository 160 may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Application repository 160 may represent a Windows or Apple "App Store" or update service, a Unix-like repository or ports collection, or other network service providing users 120 the ability to interactively or automatically download and install applications on client devices 110. If application repository 160 has security measures in place that make it difficult for attacker 180 to distribute overtly malicious software, attacker 180 may instead stealthily insert vulnerabilities into apparently-beneficial applications.

In some cases, secured enterprise 100 may provide policy directives that restrict the types of applications that can be installed from application repository 160. Thus, application repository 160 may include software that is not negligently developed and is not malware, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions and enforcing it on client devices 110.

Secured enterprise 100 may also contract with or subscribe to a security services provider 190, which may provide security services, updates, antivirus definitions, patches, products, and services. McAfee®, Inc. is a non-limiting example of such a security services provider that offers comprehensive security and antivirus solutions. In some cases, security services provider 190 may include a threat intelligence capability such as the global threat intelligence (GTI™) database provided by McAfee Inc. Security services provider 190 may update its threat intelligence database by analyzing new candidate malicious objects as they appear on client networks and characterizing them as malicious or benign.

In another example, secured enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

When a new object is first encountered on the network, security policies may initially treat it as "gray" or "suspect." As a first line of defense, a security appliance in cluster 142 may query security services provider 190 to see if the new object has a globally-recognized reputation. If so, a local reputation may be generated based on that global reputation. If not, the object is completely new and may be treated as a "candidate malicious object," meaning that its status is unknown, and it may therefore be a malicious object. At a minimum, the new object may be proscribed in its access to protected resources until its reputation can be established. This may mean that extra permission from a user 120 or security administrator 150 is required for the candidate malicious object to access protected resources.

The candidate malicious object may also be subjected to additional rigorous security analysis, particularly if it is a new object with no global reputation, or if it is an executable object. This may include, for example, submitting the object to an internal security audit, or to security services provider 190, for deep analysis. This may include running the object in a sandbox environment, expert status analysis, or other security techniques. These may help to establish a new reputation for the object.

If the object is permitted to operate on the network and malicious behavior is observed, the object may be tagged as malicious object 182. Remedial action may then be taken as appropriate or necessary. Thus, it is a goal of users 120 and security administrator 150 to configure and operate client devices 110, workload cluster 142, and enterprise network 170 so as to exclude all malicious objects, and to promptly and accurately classify candidate malicious objects.

Figure 2:
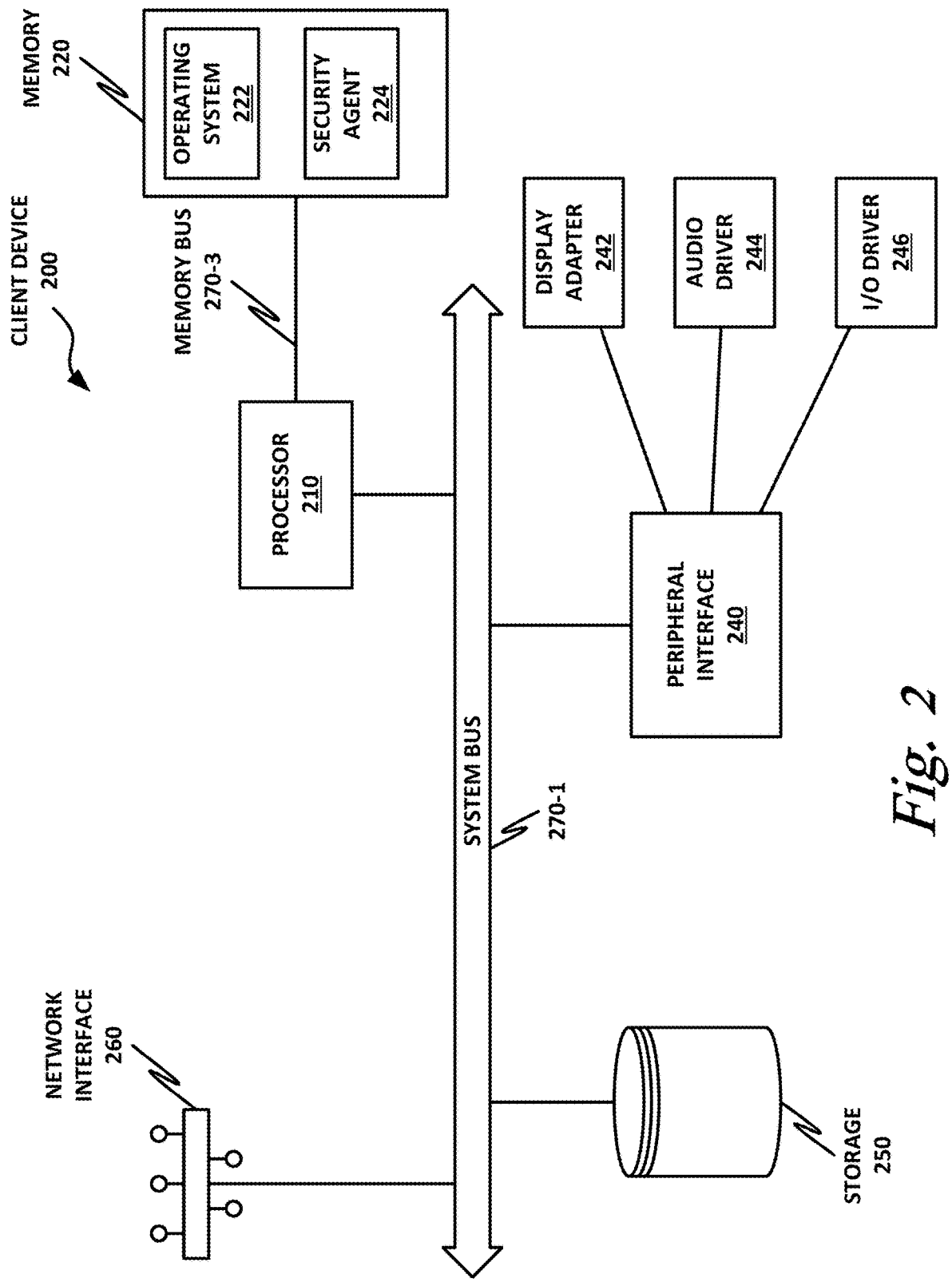
FIG. 2 is a block diagram of a computing device according to one or more examples of the present specification.

FIG. 2 is a block diagram of client device 200 according to one or more examples of the present specification. Computing device 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host."

In certain embodiments, client devices 110 may all be examples of computing devices 200.

Computing device 200 includes a processor 210 connected to a memory 220, having stored therein executable instructions for providing an operating system 222 and at least software portions of a security engine 224. Other components of client device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processors may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of security agent 224. Many other configurations are also possible, and are intended to be encompassed within the broad scope of this specification.

Network interface 260 may be provided to communicatively couple client device 200 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Security engine 224, in one example, is operable to carry out computer-implemented methods as described in this specification. Security engine 224 may include one or more tangible non-transitory computer-readable mediums having stored thereon executable instructions operable to instruct a processor to provide a security engine 224. As used throughout this specification, an "engine" includes any combination of one or more logic elements, of similar or dissimilar species, operable for and configured to perform one or more methods provided by the engine. Thus, security engine 224 may comprise one or more logic elements configured to provide methods as disclosed in this specification. In some cases, security engine 224 may include a special integrated circuit designed to carry out a method or a part thereof, and may also include software instructions operable to instruct a processor to perform the method. In some cases, security engine 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that security engine 224 may also include other hardware and software, including configuration files, registry entries, and interactive or user-mode software by way of non-limiting example.

In one example, security engine 224 includes executable instructions stored on a non-transitory medium operable to perform a method according to this specification. At an appropriate time, such as upon booting client device 200 or upon a command from operating system 222 or a user 120, processor 210 may retrieve a copy of the instructions from storage 250 and load it into memory 220. Processor 210 may then iteratively execute the instructions of security engine 224 to provide the desired method.

In certain embodiments, security engine 224 may be provisioned on client device 200 to enforce enterprise security, resource usage, or other policies. For example, when a user 120 directs client device 200 to a particular website, security engine 224 may query a server engine for an appropriate class and associated permissions. The machine may then locally enforce those permissions on client device 200. Enforcement may also be performed in whole or in part by server devices 300 (FIG. 3).

Peripheral interface 240 may be configured to interface with any auxiliary device that connects to client device 200 but that is not necessarily a part of the core architecture of client device 200. A peripheral may be operable to provide extended functionality to client device 200, and may or may not be wholly dependent on client device 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, audio driver 244, and input/output (I/O) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digital outputs such as DVI or HDMI, by way of nonlimiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of non-limiting example.

Figure 3:
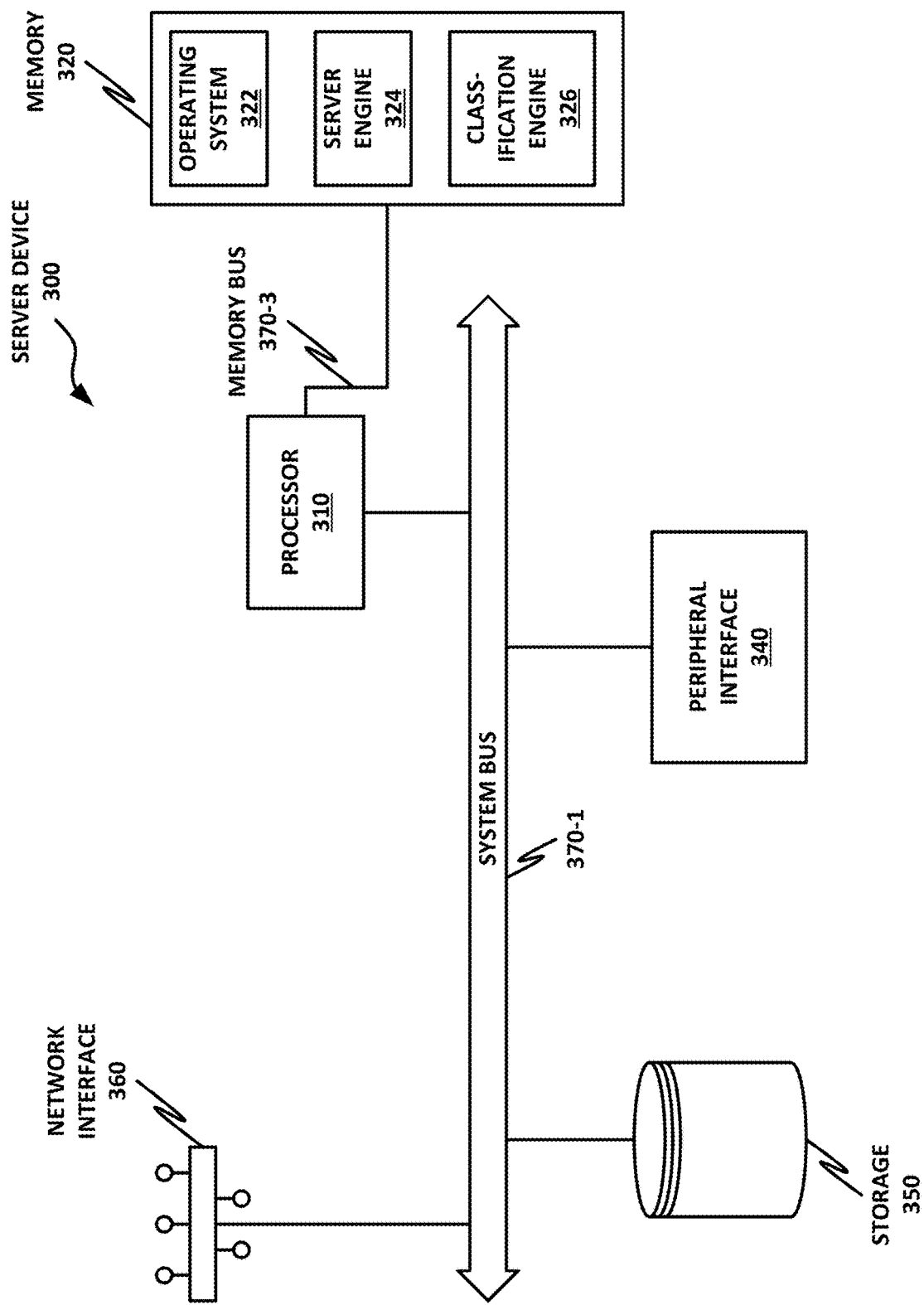
FIG. 3 is a block diagram of a server according to one or more examples of the present specification.

FIG. 3 is a block diagram of a server-class device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations according to this specification may be divided along a client-server model, wherein client device 200 provides certain localized tasks, while server 300 provides certain other centralized tasks. In contemporary practice, server 300 is more likely than client device 200 to be provided as a "headless" VM running on a computing cluster, or as a standalone appliance, though these configurations are not required.

Server 300 includes a processor 310 connected to a memory 320, having stored therein executable instructions for providing an operating system 322 and at least software portions of a server engine 324. Other components of server 300 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of server engine 324.

Network interface 360 may be provided to communicatively couple server 140 to a wired or wireless network, and may include one or more logic elements as described in FIG. 2.

Server engine 324 is an engine as described in FIG. 2 and, in one example, includes one or more logic elements operable to carry out computer-implemented methods as described in this specification. Software portions of server engine 324 may run as a daemon process.

Server engine 324 may include one or more non-transitory computer-readable mediums having stored thereon executable instructions operable to instruct a processor to provide appropriate services. At an appropriate time, such as upon booting server 140 or upon a command from operating system 322 or a user 120 or security administrator 150, processor 310 may retrieve a copy of server engine 324 (or software portions thereof) from storage 350 and load it into memory 320. Processor 310 may then iteratively execute the instructions of server engine 324 to provide the desired method.

Server engine 324 may provide services such as a web-server, database server, database file system server, network antivirus or antimalware engine, or other functions that may benefit from the classification methods disclosed herein.

Classification engine 326 is also an engine as described herein, and may include one or more logic elements operable to carry out computer-implemented methods as described in this specification. Software portions of classification engine 326 may run as a daemon process.

Classification engine 326 may include one or more non-transitory computer-readable mediums having stored thereon executable instructions operable to instruct a processor to provide classification services. At an appropriate time, such as upon booting server 140 or upon a command from operating system 322 or a user 120 or security administrator 150, processor 310 may retrieve a copy of classification engine 326 (or software portions thereof) from storage 350 and load it into memory 320. Processor 310 may then iteratively execute the instructions of classification engine 326 to provide the desired method.

Peripheral interface 340 may be configured to interface with any auxiliary device that connects to server 300 but that is not necessarily a part of the core architecture of server 300. Peripherals may include, by way of non-limiting examples, any of the peripherals disclosed in FIG. 2. In some cases, server 300 may include fewer peripherals than client device 200, reflecting that it may be more focused on providing processing services rather than interfacing directly with users.

Figure 4:
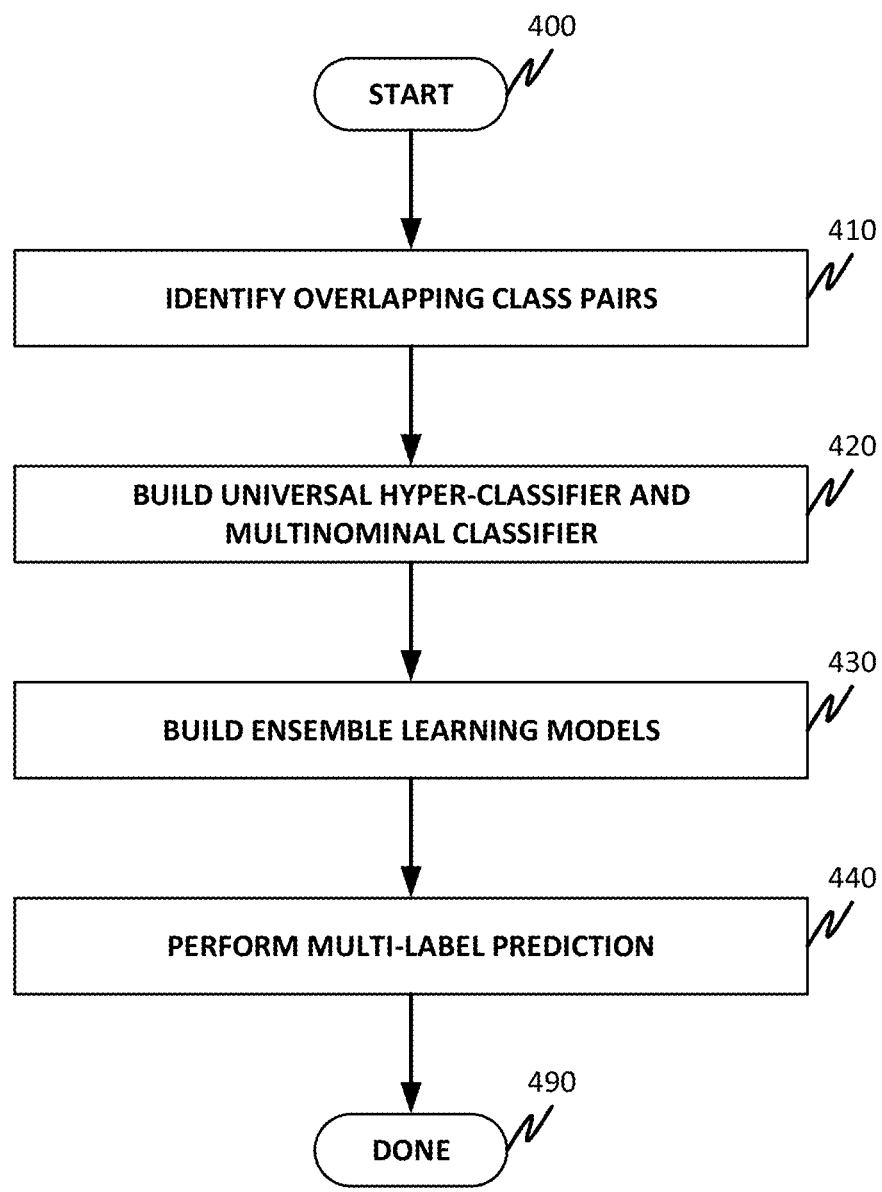
FIG. 4 is a flow chart of a method of performing classification according to one or more examples of the present specification.

FIG. 4 is a flow chart of a method 400 performed by classification engine 326 according to one or more examples of the present specification. This is referred to, for convenience, as a "three-phase" classification (i.e., the classification model is built in three phases), with a fourth phase of prediction also provided.

By way of summary, in block 410, classification engine 326 identifies overlapping class pairs. In block 420, classification engine 326 builds universal hyper-classifiers and multinominal classifiers. In block 430, classification engine 326 builds ensemble learning models. In block 440, classification engine 326 performs multi-label prediction. In block 490, the method is done. Each of these operations is described in more detail below.

In block 410, classification engine 326 identifies overlapping class pairs. In practice, the multi-labeled dataset D was divided into training, validation, and test sets, designated as $D^r$, $D^v$, and $D^s$ respectively.

This phase identifies pairs of classes that have significant overlaps in the data space, referred to herein as "overlapping class pairs" (OCPs). In one example, to identify OCPs, build a deterministic, multinomial classification model by training the following L2-regularized, L1-loss Support Vector Machine (SVM) on training set $D^r$.

$$\min_w \frac{\lambda}{2} \|w\|^2 + \sum_{i=1}^m (\max(0, 1 - y_i w^T x_i))$$

Where $x_i$ is the feature vector for instance i, w is the weight vector for features in $x_i$, m is the total number of instances in the training set $D^r$, $y_i$ is a class that belongs to a previously-known finite set of classes Y, and λ, is a regularization parameter that controls trade-off between empirical error and model complexity in SVM.

After training this classifier, determine a |Y|×|Y| "confusion matrix" using the validation set $D^v$. This confusion matrix may identify pairs of classes with significant false positive rates. For example, consider classes $y_1$, $y_2$, and $y_3$, with the confusion matrix of Table 1.

TABLE 1

Confusion Matrix

|  | $y_1$ | $y_2$ | $y_3$ |
| --- | --- | --- | --- |
| $y_1$ | 10 | 5 | 30 |
| $y_2$ | 2 | 10 | 7 |
| $y_3$ | 20 | 9 | 10 |

According to this table, classes $y_1$ and $y_3$ have significant confusion by way of false positives for each other (i.e., 30 out of 45 instances of $y_1$ misclassified as $y_3$, and similarly, 20 out of 39 instances of $y_3$ misclassified as $y_3$). Next, a "confusion" or "overlap" threshold τ may be defined. For any class with an overlap greater than τ, the classes may be designated as an OCP.

In block 420, classification engine 326 builds universal hyper-classifiers and multinominal classifiers.

The hyperclassifier is used to deal with the multi-labeling aspect of the classification. The universal hyperclassifier takes the form h: X→N, which maps an instance of i ∈ X to the number of classes that can be associated with that instance. In doing so, L2-regularized, L2-loss Support Vector Regression (SVR) may be used.

After estimating the number of classes, k, for instance i, predict the probabilistic association of instance i with each class in Y, and select $[y_1, y_2, \ldots, y_k]$ classes that have the highest probabilistic association with instance i. This can be done by building another multinomial classifier p: X→$[y_1, y_2, \ldots, y_k]$ by training a L2-regularized Logistic Regression model on the training set $D^r$, and determining appropriate regularization parameter for this model using validation set $D^v$. The L2-regularized Logistic Regression model is formally specified as:

$$\min_w \frac{\lambda}{2} \|w\|^2 + \sum_{i=1}^m \log(1 + e^{-y_i w^T x_i})$$

This provides the required probabilistic association of instance i with each class in Y. Select k classes that have the highest probabilistic association with instance i as the predicted classes $[y_1, y_2, \ldots, y_k]$ for i. This provides an option for resolving the multi-labeling aspect of a web-scale, multi-labeling classification problem.

In block 430, classification engine 326 builds ensemble models for OCPs. This phase deals with the class overlap aspect of the classification problem, and may use results obtained in block 410.

For each OCP identified in block 410, an ensemble learning based model may be used to distinguish between class boundaries. Concretely, classification engine 326 may build an ensemble of classifiers or "experts" for each OCP (y,y'), for example based on short textual descriptions, of the instances belonging to classes y and y'. Such short-text descriptions may include, by way of nonlimiting example, a title of a web page, summary of a web page, key-words, URL, abstract, summary, file location, or any other suitable data. By way of nonlimiting example, for OCP (y,y'), classification engine 326 may build the following types of experts using the training set $D^r$:

A binomial expert based on the title text of object instances in classes y and y'.

A binomial expert based on summary descriptions of the instances in classes y and y'.

A binomial expert based on key-word text of the instances in classes y and y'.

This creates an ensemble E of experts for OCP (y,y'). With each expert in the ensemble, classification engine 326 assigns an initial "weight" that reflects the accuracy of each expert in distinguishing between classes y and y'. Initially, equal weights may be assigned, i.e., 1/E, for all experts in the ensemble for OCP (y, y').

Weights may be updated as each expert is validated against validation set $D^v$. To do this, classification system 326 may first extract instances belonging to classes y and y' from the validation set $D^v$, and then for each extracted instance, compute the ensemble prediction as follows:

$$\hat{y}_i = \frac{\sum_{e=1}^{|E|} w_e \hat{q}_e, i}{\sum_{j=1}^{|E|} w_j}$$

In this example, $\hat{y}_i$ is the ensemble prediction for instance i, $w_e$ is the weight of expert e and, $\hat{q}_e$, i is the prediction of expert e for instance i. It may be noted that the ensemble prediction in the above equation is a convex combination of the prediction of experts in the ensemble. After every n instances, the loss function $l(\hat{y}_n, y_n)$ may be computed to quantify how far-off ensemble prediction $\hat{y}_n$ is from the actual outcome $y_n$. Similarly, the loss function $l(\hat{q}_{e,n}, y_n)$ may be computed to quantify the difference between prediction of expert e and the actual outcome $\hat{y}_n$ after n instances.

Using these terms, cumulative regret $R_{e,n} = l(\hat{y}_n, y_n) - l(\hat{q}_{e,n}, y_n)$ may be computed. This may be different from the ensemble's cumulative loss and that of expert e after n instances. In other words, it is the total loss suffered by the ensemble due to deviating from or ignoring the prediction or advice of expert e.

Having computed the cumulative regret, classification engine 326 may use an exponentially weighted average forecaster to minimize the cumulative regret by assigning a large weight to an expert if the cumulative regret with respect to that expert is large. Concretely, in this forecaster, the weight assigned to expert e after n instances is of the form:

$$w_e = \frac{e^{\eta R_{e,n}}}{\sum_{j=1}^{|E|} e^{\eta R_{j,n}}}$$

Here, η is a positive parameter. In this way, after every n instance, the weights of each expert e in the ensemble may be updated for every OCP (y, y'), and classification engine 326 may obtain optimal weights for the experts using the validation set. This kind of ensemble of experts built for each OCP helps in better distinguishing between the instances of classes y and y', thereby resolving the class overlap issue to a significant extent.

Block 440 is a prediction phase. Here, classification engine 326 builds a multi-labeled prediction for each instance in the test set $D^s$. For each instance i in the test set, the hyper-classifier predicts the number of classes, k, which can be associated with instance i. Thereafter, the universal multinomial classifier built in block 430 predicts [$y_1$, . . . , $y_k$] classes for instance i.

If, for any OCP (y, y'), the difference between the probabilistic association for classes y and y', as given by the multinomial classifier, is less than a threshold value a, then the ensemble model for that OCP may be used to better distinguish between the two classes. In other words, the ensemble models are used selectively and invoked only if the multinomial classifier makes a "close enough" prediction for the overlapping classes for instance, i from a probabilistic perspective.

This last step in the prediction phase has been experimentally verified to be highly useful in reducing misclassifications from class overlap in the data space. Thus, multi-labeled predictions for each instance in a web-scale dataset may be made using this three-tiered classification framework, in the presence of large overlapping classes in the data space.

Indeed, an illustrative embodiment of the machine classifier of the present specification has been constructed and tested as described below.

Experimentally, a real production dataset comprising 1.2 million instances from 11 classes was used. The dataset was divided into training, validation, and test datasets in 6:1:3 ratios respectively (i.e., 60% training, 10% validation, 30% test). For comparison purposes, two other algorithms in the machine learning domain were used, namely Support Vector Machines (SVM), and Logistic Regression (LR). Both baselines were trained on the training dataset, and their respective regularization parameters were selected using the validation dataset.

Figure 5:
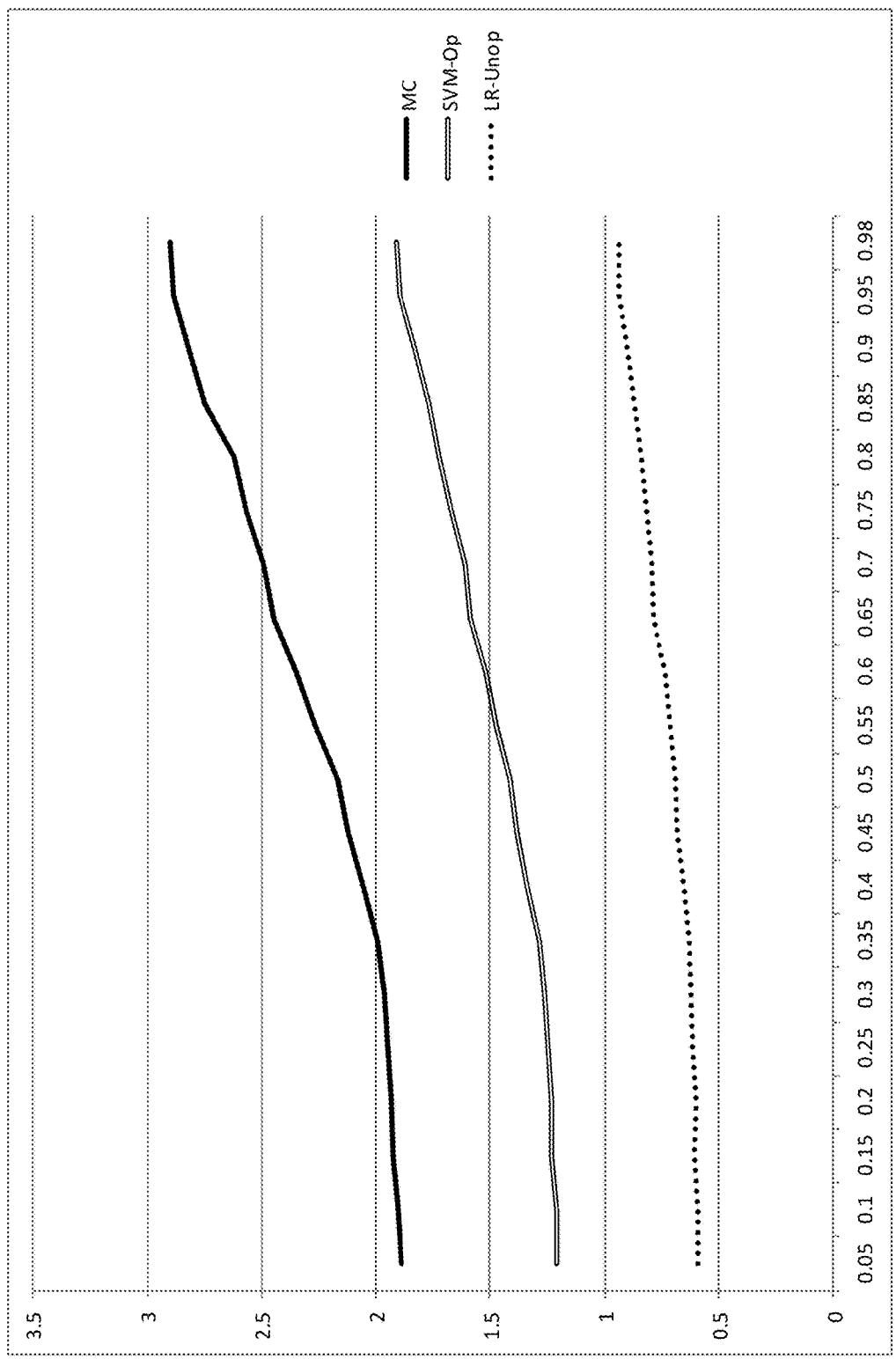
FIG. 5 is a line graph illustrating testing results for micro-precision.

FIG. 5 discloses a micro-precision comparison between the baseline algorithms and a machine classifier according to this specification, marked as MC in the figure, in terms of micro precision. Micro-precision was first computed individually for each class and then averaged over all the classes. For each instance, the classification engine outputs not only the classification label, but also the probability for that classification.

In this use case, a probability threshold was chosen at which the classification was deemed probably correct. For instance, choosing 0.4 as the threshold may imply that only if an instance has been assigned a class with probability greater than 0.4 is it considered correct, and thus usable for business needs. Otherwise, the classification result is discarded.

In the graph of FIG. 5, the probability threshold is shown on the X-axis, and micro-precision of each algorithm on the Y-axis. Here, it is seen that, if a low threshold (e.g., 0.05) is used, the machine classifier outperforms both baseline algorithms in terms of micro-precision by statistically-significant margins of 0.09 (9%) and 0.06 (6%) respectively. This outperformance is maintained across the full spectrum of thresholds.

Figure 6:
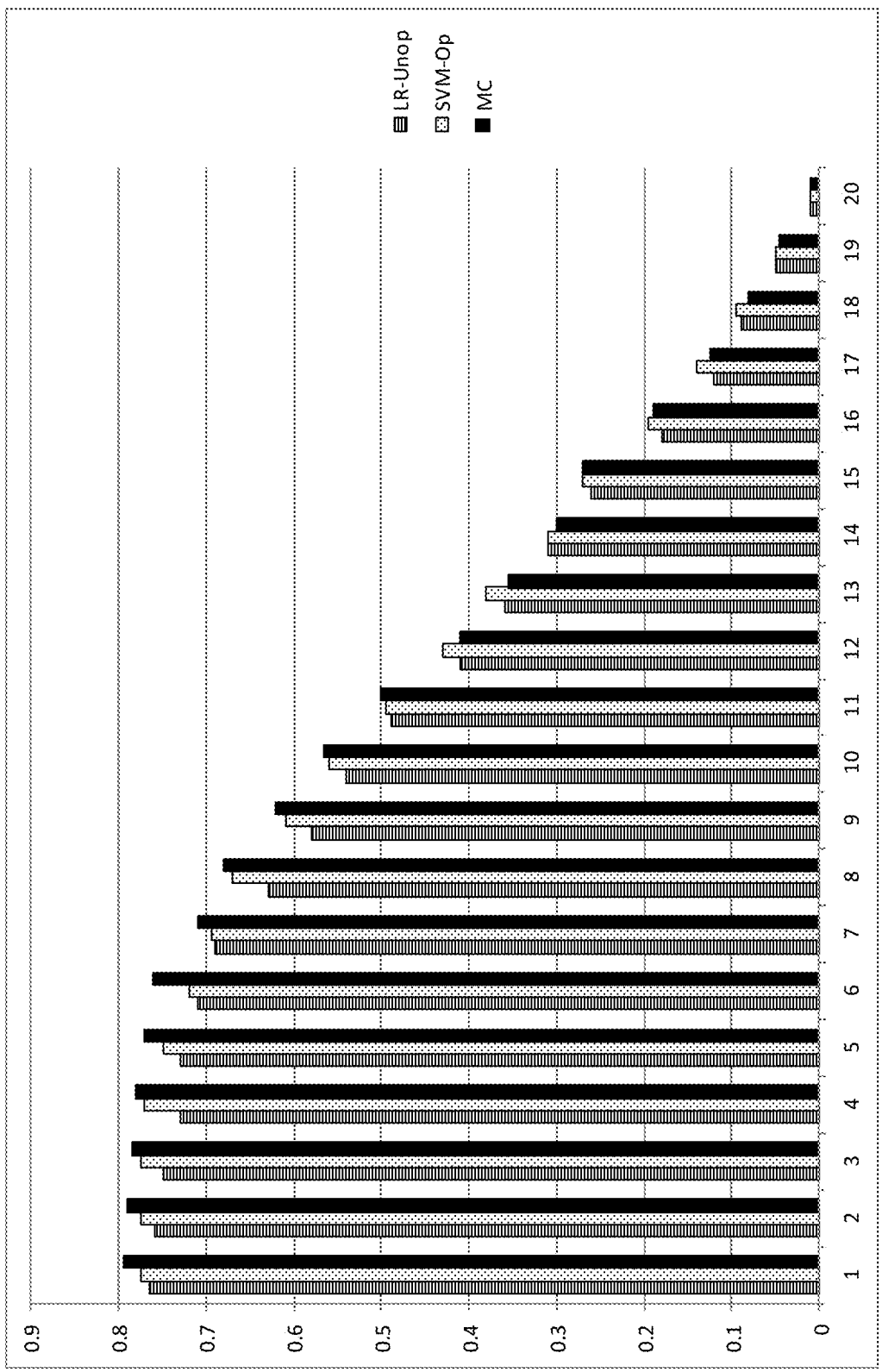
FIG. 6 is a bar graph illustrating testing results for micro-recall.

FIG. 6 is a bar graph of micro-recall results. Specifically, along the lines of micro-precision, micro-recall was computed by first computing recall individually for each class and then averaging them over all the classes. Here, the machine classifier, marked MC on the chart, again outperforms the other test algorithms, in this case by a margin of approximately 0.01-0.03 (1% to 3%). In no case was the machine classifier worse than the other two algorithms.

Thus, the empirical evaluation shows that the machine classifier of the present specification out-performs the comparison algorithms in terms of both precision and recall, thereby making it effective for use in practical, large-scale business scenarios.

Figure 7A:
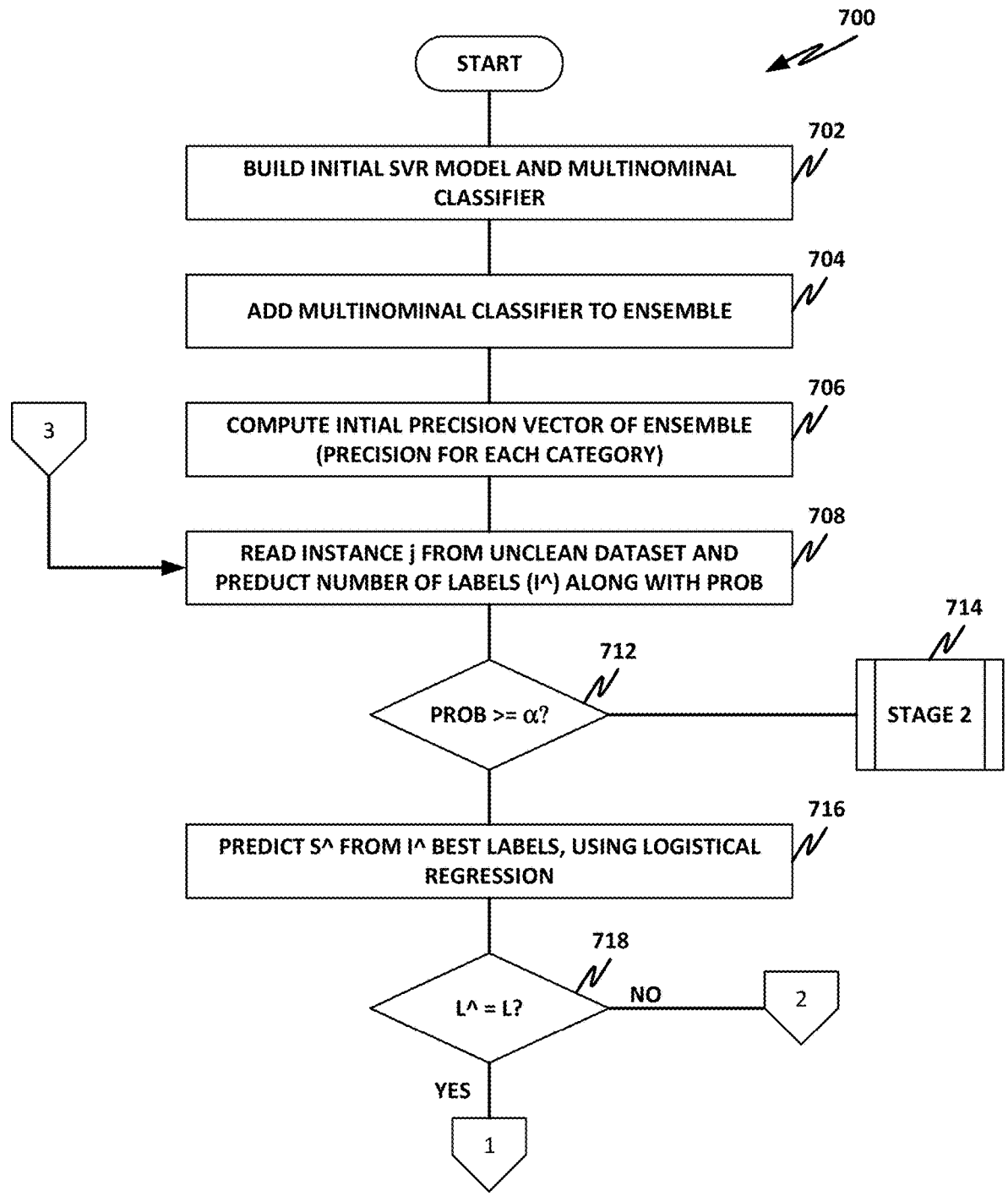
FIGS. 7*a* and 7*b* are a flow chart of a method of content recategorization according to one or more examples of the present specification
Figure 7B:
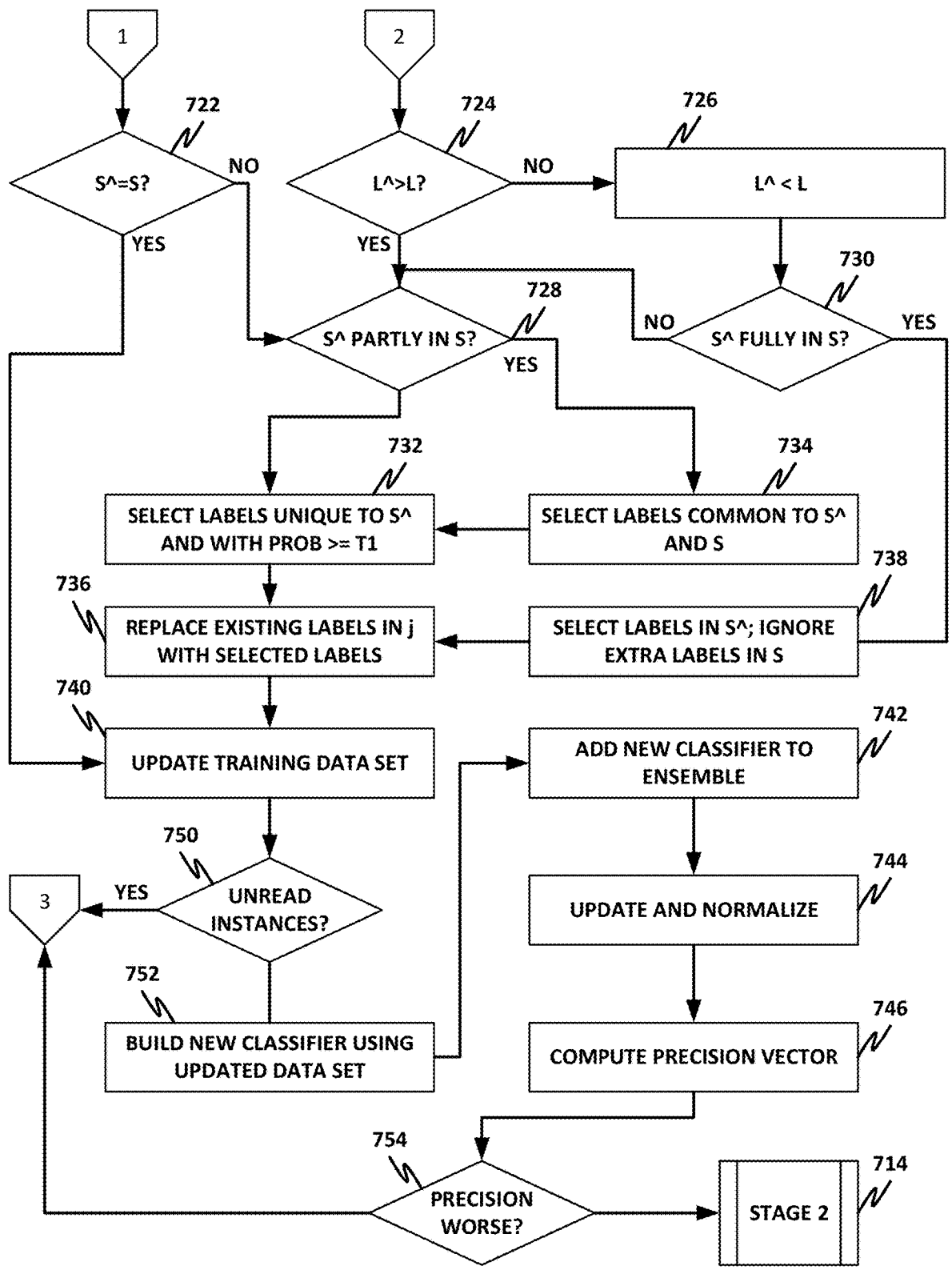

FIGS. 7a and 7b are a flow chart of a method of recategorization according to one or more examples of the present specification. In an embodiment, the disclosed recategorization method has two stages. FIGS. 7a and 7b explicitly disclose "Stage 1." "Stage 2" reuses selected operations of Stage 1, and thus will also be described with reference to FIGS. 7a and 7b.

Stage 1 is expressly described by FIGS. 7a and 7b. Stage 1 begins with inputs, namely: (1) a small, clean multi-labeled dataset; (2) an unclean multi-labeled dataset that needs to be cleansed; (3) a probability threshold a for the number of labels; and (4) probability thresholds for each category, denoted by $T^1$.

In block 702, classification engine 324 partitions the clean dataset into training, validation and test sets. Classification engine 324 then uses the training set to build a support vector regression (SVR) model capable of predicting a number of labels that could be associated with each document. Classification engine 324 then adds a multinomial classifier (using, for example, logistic regression) capable of predicting the labels that could be associated with each document.

In block 704, after training both of these models, classification engine 324 uses the validation set to tune models' parameters. The initial multinomial classifier is then added to the ensemble.

In block 706, using the test dataset, classification engine 324 computes the precision of the current ensemble for each category and stores it in a vector.

In block 708, classification engine 324 reads a document j from the given unclean dataset and predicts the number of labels, denoted by $\hat{l}$, for instance j using the SVR model created in clock 702. Along with $\hat{l}$, classification engine 324 also computes its probability.

In decision block 712, if the probability of $\hat{l}$ is greater than or equal to a pre-defined threshold value a, then classification engine 324 predict a set of $\hat{l}$ best labels using the multinomial classifier trained in block 702. If not, then in block 714, stage 2 is performed.

Next, classification engine 324 selects the labels from $\hat{S}$ and S that must be associated with document j. In doing so, three cases may be observed:

Block 718: The predicted number of labels ($\hat{l}$) equals the existing number of labels (l). In that case, the subcases of blocks 722, 728, and 730 may be observed.

Block 722: The predicted set of labels ($\hat{S}$) equals the existing set of labels (S). In this case, the existing set of labels is said to be validated/verified and classification engine 324 proceeds to block 740.

Block 728: $\hat{S}$ is not equal to S, but $\hat{S}$ has one or more labels in common with S. If so, in block 732, classification engine 324 select labels common to $\hat{S}$ and S, and those labels that are unique to $\hat{S}$ that have a probability greater than or equal to the corresponding threshold value defined in $T^1$.

Block 730: $\hat{S}$ and S do not have any common labels. In this case, classification engine 324 selects only those labels from $\hat{S}$ whose probability is greater than or equal to the corresponding threshold value defined in $T^{1*}$.

Returning to block 718, if $\hat{l} \neq l$, then in decision block 724, classification engine 324 checks whether $\hat{l} > l$. If so, then blocks 728 may be encountered again, with the flow as before.

In block 726, if $\hat{l} < l$, then decision block 730 is encountered again, with the resulting flow.

Returning to block 730, if $\hat{S}$ is at fully contained in S, then in block 738, classification engine 324 selects labels in $\hat{S}$ and ignores extra labels in S. Then in block 736, having selected labels for document j, classification engine 324 replaces existing labels in j with selected labels.

Returning to block 728, if $\hat{S}$ is partly (but not fully) in S, then in block 734, classification engine 324 selects labels common to $\hat{S}$ and S. Block 732 is then encountered again, with control passing as before.

If $\hat{S}$ is not partly in S, then there is no commonality between $\hat{S}$ and S. In that case, control passes to block 732 as before.

In decision block 750, if the unclean dataset still has unread and unprocessed instances, then control passes back to block 708 for another pass.

In block 752, all instances j have been read and processed. Thus, the training dataset can be updated with clean documents extracted from the unclean dataset. The unclean dataset is left with lesser documents that are yet to be processed/cleansed in later stages of this process.

In block 742, using the updated training dataset, classification engine 324 builds a new multinomial classifier and adds it to the ensemble, for example in accordance with dynamic weighted majority.

In block 744, classification engine 324 assign a weight to the new classifier in accordance with its overall precision, and normalizes the weights of the existing classifiers in the ensemble such that the sum of all classifiers in the ensemble add to 1.

In block 746, classification engine 324 computes the precision of the new ensemble using the test set (created in block 702) for each category.

In block 754, if the precision of the updated ensemble is worse than that of the old ensemble for any category by more than a threshold, such as by 1%, then in block 714 classification engine 324 terminates stage 1 and proceeds to stage 2.

If the precision is not worse, then control passes back to block 708, and using the updated (and larger) ensemble of classifiers, classification engine 324 repeats the remaining operations to re-categorize remaining documents in the unclean dataset.

The outputs of stage 1 are an enhanced clean training dataset, and a reduced unclean dataset.

Stage 2 is similar to stage 1. The inputs to stage 2 include, by way of example, (1) a probability difference threshold ($\varepsilon$); (2) a resultant updated training dataset from stage 1; (3) a reduced unclean dataset from stage 1; and (4) different probability thresholds for each category, $T^2$.

In certain embodiments, the thresholds defined in $T^2$ are looser than the thresholds $T^1$ used in stage 1.

Using these inputs, for stage 2, classification engine 324 repeats blocks 702, 704, and 706.

Classification engine 324 then computes the probability of the existing number of labels. If the difference in probability of $\hat{l}$ and probability of l is less than or equal to threshold value $\varepsilon$, then classification engine 324 consider l to be correct, in which case $|\hat{S}|=l=|S|$.

Next, classification engine 324 selects the labels from $\hat{S}$ and S that must be associated with document j. In doing so, classification engine 324 may observe blocks 722, 728, and 730. Classification engine 324 may then proceed as above, except that now classification engine 324 uses a looser set of thresholds $T^2$.

Blocks 740 and those that follow may be repeated as with stage 1.

The output of stage 2 is a recategorized and cleansed dataset.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for"

or "steps for" are specifically used in the particular claims; and (b) does not intend, by any statement in the specification, to limit this disclosure in any way that is not otherwise reflected in the appended claims.

Example Implementations

There is disclosed in one example, a computing apparatus, comprising: one or more logic elements, including at least one hardware logic element, comprising a classification engine to: receive a clean multi-labeled dataset comprising a plurality of document each assigned to one or more of a plurality of categories; receive an unclean multi-labeled dataset; and produce a recategorized and cleansed dataset from the unclean multi-labeled dataset, comprising predicting a number of labels $\hat{l}$ for a document j, and comparing $\hat{l}$ to an existing number of labels l.

There is further disclosed an example, wherein the classification engine is further to divide at least part of the clean multi-labeled dataset into a training dataset.

There is further disclosed an example, wherein the classification engine is further to use the training set to build a support vector regression model to predict a number of labels to associate with j.

There is further disclosed an example, wherein the classification engine is further to divide at least part of the clean multi-labeled dataset into a validation set, and to use the validation set to tune the classification engine.

There is further disclosed an example, wherein producing the recategorized and cleaned dataset from the unclean multi-labeled dataset further comprises: receiving a probability threshold a for a number of labels; computing a probability for $\hat{l}$; and determining that the probability for $\hat{l}$ is greater than a.

There is further disclosed an example, wherein producing the recategorized and cleaned dataset from the unclean multi-labeled dataset further comprises computing a set of predicted labels $\hat{S}$ for j.

There is further disclosed an example, wherein producing the recategorized and cleaned dataset from the unclean multi-labeled dataset further comprises comparing $\hat{S}$ to a set of existing labels S.

There is further disclosed an example, wherein producing the recategorized and cleaned dataset from the unclean multi-labeled dataset further comprises determining that $\hat{S}$ is partly but not fully contained in S, and replacing S with labels unique to $\hat{S}$ that have a probability greater than a threshold $T^1$.

There is further disclosed an example, wherein producing the recategorized and cleaned dataset from the unclean multi-labeled dataset further comprises determining that $\hat{S}$ is fully contained in S, and replacing S with $\hat{S}$.

There is further disclosed an example, wherein producing the recategorized and cleaned dataset from the unclean multi-labeled dataset further comprises determining that $\hat{S}$ is not contained in S, and replacing S with labels common to $\hat{S}$ and S, along with labels unique to $\hat{S}$ that have a probability greater than a threshold $T^1$.

There is further disclosed an example, wherein the classification engine is further to build a classifier from the recategorized and cleansed dataset.

There is further disclosed an example, wherein the classification engine is further to compare a precision of the classifier to a precision of a prior classifier.

There is further disclosed in an example, one or more tangible, non-transitory computer-readable mediums having stored thereon executable instructions for providing a classification engine to: receive a clean multi-labeled dataset comprising a plurality of document each assigned to one or more of a plurality of categories; receive an unclean multi-labeled dataset; and produce a recategorized and cleansed dataset from the unclean multi-labeled dataset, comprising predicting a number of labels $\hat{l}$ for a document j, and comparing $\hat{l}$ to an existing number of labels l.

There is further disclosed an example, wherein the classification engine is further to divide at least part of the clean multi-labeled dataset into a training dataset.

There is further disclosed an example, wherein the classification engine is further to use the training set to build a support vector regression model to predict a number of labels to associate with j.

There is further disclosed an example, wherein the classification engine is further to divide at least part of the clean multi-labeled dataset into a validation set, and to use the validation set to tune the classification engine.

There is further disclosed an example, wherein producing the recategorized and cleaned dataset from the unclean multi-labeled dataset further comprises: receiving a probability threshold a for a number of labels; computing a probability for $\hat{l}$; and determining that the probability for $\hat{l}$ is greater than a.

There is further disclosed an example, wherein producing the recategorized and cleaned dataset from the unclean multi-labeled dataset further comprises computing a set of predicted labels $\hat{S}$ for j.

There is further disclosed an example, wherein producing the recategorized and cleaned dataset from the unclean multi-labeled dataset further comprises comparing $\hat{S}$ to a set of existing labels S.

There is further disclosed an example, wherein producing the recategorized and cleaned dataset from the unclean multi-labeled dataset further comprises determining that $\hat{S}$ is partly but not fully contained in S, and replacing S with labels unique to $\hat{S}$ that have a probability greater than a threshold $T^1$.

There is further disclosed an example, wherein producing the recategorized and cleaned dataset from the unclean multi-labeled dataset further comprises determining that $\hat{S}$ is fully contained in S, and replacing S with $\hat{S}$.

There is further disclosed an example, wherein producing the recategorized and cleaned dataset from the unclean multi-labeled dataset further comprises determining that $\hat{S}$ is not contained in S, and replacing S with labels common to $\hat{S}$ and S, along with labels unique to $\hat{S}$ that have a probability greater than a threshold $T^1$.

There is further disclosed in an example, a method of providing a classification engine, comprising: receiving a clean multi-labeled dataset comprising a plurality of document each assigned to one or more of a plurality of categories; receiving an unclean multi-labeled dataset; and producing a recategorized and cleansed dataset from the unclean multi-labeled dataset, comprising predicting a number of labels $\hat{l}$ for a document j, and comparing $\hat{l}$ to an existing number of labels l.

There is further disclosed an example, further comprising dividing at least part of the clean multi-labeled dataset into a training dataset.

There is further disclosed an example, further comprising using the training set to build a support vector regression model to predict a number of labels to associate with j.

There is further disclosed an example, further comprising dividing at least part of the clean multi-labeled dataset into a validation set, and to use the validation set to tune the classification engine.

There is further disclosed an example, wherein producing the recategorized and cleaned dataset from the unclean multi-labeled dataset further comprises: receiving a probability threshold a for a number of labels; computing a probability for $\hat{l}$; and determining that the probability for $\hat{l}$ is greater than a.

There is further disclosed an example, wherein producing the recategorized and cleaned dataset from the unclean multi-labeled dataset further comprises computing a set of predicted labels $\hat{S}$ for j.

There is further disclosed an example, wherein producing the recategorized and cleaned dataset from the unclean multi-labeled dataset further comprises comparing $\hat{S}$ to a set of existing labels S.

There is further disclosed an example, wherein producing the recategorized and cleaned dataset from the unclean multi-labeled dataset further comprises determining that $\hat{S}$ is partly but not fully contained in S, and replacing S with labels unique to $\hat{S}$ that have a probability greater than a threshold $T^1$.

There is further disclosed an example, wherein producing the recategorized and cleaned dataset from the unclean multi-labeled dataset further comprises determining that $\hat{S}$ is fully contained in S, and replacing S with $\hat{S}$.

There is further disclosed an example, wherein producing the recategorized and cleaned dataset from the unclean multi-labeled dataset further comprises determining that $\hat{S}$ is not contained in S, and replacing S with labels common to $\hat{S}$ and S, along with labels unique to $\hat{S}$ that have a probability greater than a threshold $T^1$.

There is further disclosed an example of one or more tangible, non-transitory computer-readable storage mediums having stored thereon executable instructions for instructing one or more processors for providing a classification engine operable for performing any or all of the operations of the preceding examples.

There is further disclosed an example of a method of providing a classification engine comprising performing any or all of the operations of the preceding examples.

There is further disclosed an example of an apparatus comprising means for performing the method.

There is further disclosed an example wherein the means comprise a processor and a memory.

There is further disclosed an example wherein the means comprise one or more tangible, non-transitory computer-readable storage mediums.

There is further disclosed an example wherein the apparatus is a computing device.

What is claimed is:

1. A computing apparatus, comprising:
   a hardware platform comprising a processor and a memory; and
   one or more tangible, non-transitory computer-readable mediums having instructions to provide a two-phase classification engine to:
   in a first phase, receive a clean multi-labeled dataset comprising a plurality of documents, each assigned to one or more categories from a set of fixed categories;
   receive an unclean multi-labeled dataset, wherein at least some objects of the unclean multi-labeled dataset belong to overlapping classes, wherein the probability that a document belongs to the overlapping classes is approximately equal;
   produce a recategorized and cleansed dataset from the unclean multi-labeled dataset, comprising predicting a number of labels $\hat{l}$ for a document j, and comparing $\hat{l}$ to an existing number of labels $\hat{l}$; and
   in a second phase, compute from the recategorized and cleansed dataset a probability difference between l and $\hat{l}$ for j, and take l to be correct if the difference is less than or equal to a threshold.

2. The computing apparatus of claim 1, wherein the two-phase classification engine is further to divide at least part of the clean multi-labeled dataset into a training dataset.

3. The computing apparatus of claim 2, wherein the two-phase classification engine is further to use the training dataset to build a support vector regression model to predict a number of labels to associate with document j.

4. The computing apparatus of claim 3, wherein the two-phase classification engine is further to divide at least part of the clean multi-labeled dataset into a validation set, and to use the validation set to tune the two-phase classification engine.

5. The computing apparatus of claim 1, wherein producing the recategorized and cleansed dataset from the unclean multi-labeled dataset further comprises:
   receiving a probability threshold a for a number of labels;
   computing a probability for $\hat{l}$; and
   determining that the probability for $\hat{l}$ is greater than $\alpha$.

6. The computing apparatus of claim 1, wherein producing the recategorized and cleansed dataset from the unclean multi-labeled dataset further comprises computing a set of predicted labels $\hat{S}$ for document j.

7. The computing apparatus of claim 6, wherein producing the recategorized and cleansed dataset from the unclean multi-labeled dataset further comprises comparing $\hat{S}$ to a set of existing labels S.

8. The computing apparatus of claim 7, wherein producing the recategorized and cleansed dataset from the unclean multi-labeled dataset further comprises determining that $\hat{S}$ is partly but not fully contained in S, and replacing S with labels unique to $\hat{S}$ that have a probability greater than a threshold $T^1$.

9. The computing apparatus of claim 7, wherein producing the recategorized and cleansed dataset from the unclean multi-labeled dataset further comprises determining that $\hat{S}$ is fully contained in S, and replacing S with $\hat{S}$.

10. The computing apparatus of claim 7, wherein producing the recategorized and cleansed dataset from the unclean multi-labeled dataset further comprises determining that $\hat{S}$ is not contained in S, and replacing S with labels common to $\hat{S}$ and S, along with labels unique to $\hat{S}$ that have a probability greater than a threshold $T^1$.

11. The computing apparatus of claim 1, wherein the two-phase classification engine is further to build a classifier from the recategorized and cleansed dataset.

12. The computing apparatus of claim 11, wherein the two-phase classification engine is further to compare a precision of the classifier to a precision of a prior classifier.

13. One or more tangible, non-transitory computer-readable mediums having stored thereon executable instructions for providing a two-phase classification engine to:
   in a first phase, receive a clean multi-labeled dataset comprising a plurality of documents, each assigned to one or more categories from a set of fixed categories;
   receive an unclean multi-labeled dataset, wherein at least some objects of the unclean multi-labeled dataset belong to overlapping classes, wherein the probability that a document belongs to the overlapping classes is approximately equal;
   produce a recategorized and cleansed dataset from the unclean multi-labeled dataset, comprising predicting a number of labels $\hat{l}$ for a document j, and comparing $\hat{l}$ to an existing number of labels l; and in a second phase, compute from the recategorized and cleansed dataset a probability difference between l and $\hat{l}$ for j, and take l to be correct if the difference is less than or equal to a threshold.

14. The one or more tangible, non-transitory computer-readable mediums of claim 13, wherein the two-phase classification engine is further to divide at least part of the clean multi-labeled dataset into a training dataset.

15. The one or more tangible, non-transitory computer-readable mediums of claim 14, wherein the two-phase classification engine is further to use the training dataset to build a support vector regression model to predict a number of labels to associate with document j.

16. The one or more tangible, non-transitory computer-readable mediums of claim 15, wherein the two-phase classification engine is further to divide at least part of the clean multi-labeled dataset into a validation set, and to use the validation set to tune the two-phase classification engine.

17. The one or more tangible, non-transitory computer-readable mediums of claim 13, wherein producing the recategorized and cleansed dataset from the unclean multi-labeled dataset further comprises:

receiving a probability threshold a for a number of labels;
computing a probability for $\hat{l}$; and
determining that the probability for $\hat{l}$ is greater than $\alpha$.

18. The one or more tangible, non-transitory computer-readable mediums of claim 13, wherein producing the recategorized and cleansed dataset from the unclean multi-labeled dataset further comprises computing a set of predicted labels $\hat{S}$ for document j.

19. The one or more tangible, non-transitory computer-readable mediums of claim 18, wherein producing the recategorized and cleansed dataset from the unclean multi-labeled dataset further comprises comparing $\hat{S}$ to a set of existing labels S.

20. The one or more tangible, non-transitory computer-readable mediums of claim 19, wherein producing the recategorized and cleansed dataset from the unclean multi-labeled dataset further comprises determining that $\hat{S}$ is partly but not fully contained in S, and replacing S with labels unique to $\hat{S}$ that have a probability greater than a threshold $T^1$.

21. The one or more tangible, non-transitory computer-readable mediums of claim 19, wherein producing the recategorized and cleansed dataset from the unclean multi-labeled dataset further comprises determining that $\hat{S}$ is fully contained in S, and replacing S with $\hat{S}$.

22. The one or more tangible, non-transitory computer-readable mediums of claim 19, wherein producing the recategorized and cleansed dataset from the unclean multi-labeled dataset further comprises determining that $\hat{S}$ is not contained in S, and replacing S with labels common to $\hat{S}$ and S, along with labels unique to S that have a probability greater than a threshold $T^1$.

23. A computer-implemented method of providing two-phase multi-label content recategorization, comprising:

in a first phase, receiving a clean multi-labeled dataset comprising a plurality of documents, each assigned to one or more categories from a set of fixed categories;

receiving an unclean multi-labeled dataset, wherein at least some objects of the unclean multi-labeled dataset belong to overlapping classes, wherein the probability that a document belongs to the overlapping classes is approximately equal;

producing a recategorized and cleansed dataset from the unclean multi-labeled dataset, comprising predicting a number of labels $\hat{l}$ for a document j, and comparing $\hat{l}$ to an existing number of labels l; and in a second phase, computing from the recategorized and cleansed dataset a probability difference between l and $\hat{l}$ for j, and take l to be correct if the difference is less than or equal to a threshold.

24. The method of claim 23, wherein producing the recategorized and cleansed dataset from the unclean multi-labeled dataset further comprises:

receiving a probability threshold a for a number of labels;
computing a probability for $\hat{l}$; and
determining that the probability for $\hat{l}$ is greater than $\alpha$.

25. The method of claim 23, wherein producing the recategorized and cleansed dataset from the unclean multi-labeled dataset further comprises comparing $\hat{S}$ to a set of existing labels S.

* * * * *

UNITED STATES PATENT AND TRADEMARK OFFICE
CERTIFICATE OF CORRECTION

PATENT NO. : 10,691,739 B2
APPLICATION NO. : 14/977875
DATED : June 23, 2020
INVENTOR(S) : Nidhi Singh et al.

Page 1 of 1

It is certified that error appears in the above-identified patent and that said Letters Patent is hereby corrected as shown below:

On the Title Page

In Column 1, under "(71) Applicant:", Line 1, delete "Plano, TX" and insert -- Santa Clara, CA. --, therefor.

In the Drawings

On Drawings Sheet 7 of 8, Reference Numeral 706, FIG. 7a, Line 2, delete "INTIAL;" and insert -- INITIAL; --, therefor.

On Drawings Sheet 7 of 8, Reference Numeral 708, FIG. 7a, Line 2, delete "PREDUCT;" and insert -- PREDICT; --, therefor.

In the Claims

In Column 24, Line 2, in Claim 1, delete "Î;" and insert -- I; --, therefor.

In Column 24, Line 22, in Claim 5, delete "threshold a" and insert -- threshold $\alpha$ --, therefor.

In Column 25, Line 25, in Claim 17, delete "threshold a" and insert -- threshold $\alpha$ --, therefor.

In Column 26, Line 11, in Claim 22, delete "S that" and insert -- Ŝ that --, therefor.

In Column 26, Line 36, in Claim 24, delete "threshold a" and insert -- threshold $\alpha$ --, therefor.

Signed and Sealed this
Twenty-eighth Day of July, 2020

Andrei Iancu
*Director of the United States Patent and Trademark Office*